(12) United States Patent
Takahashi

(10) Patent No.: US 10,071,540 B2
(45) Date of Patent: Sep. 11, 2018

(54) RESIN-JUNCTION MATERIAL AND JOINING METHOD FOR RESIN MEMBER

(71) Applicant: Funai Electric Co., Ltd., Osaka (JP)

(72) Inventor: Yutaka Takahashi, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 252 days.

(21) Appl. No.: 14/592,345

(22) Filed: Jan. 8, 2015

(65) Prior Publication Data

US 2015/0197074 A1 Jul. 16, 2015

(30) Foreign Application Priority Data

Jan. 10, 2014 (JP) ................................. 2014-003711

(51) Int. Cl.
*B32B 27/08* (2006.01)
*B32B 37/18* (2006.01)
(Continued)

(52) U.S. Cl.
CPC .......... *B32B 27/08* (2013.01); *B29C 65/1612* (2013.01); *B29C 65/1629* (2013.01);
(Continued)

(58) Field of Classification Search
CPC ... B32B 27/08; B32B 237/18; B32B 38/0008; B32B 38/04; B32B 38/10; B32B 2038/047; B29C 66/24221; B29C 66/24244; B29C 66/1122; B29C 66/73362; B29C 66/81267; B29C 66/1312; B29C 66/54; B29C 66/02; B29C 66/8322; B29C 66/81429; B29C 66/1162; B29C 66/1142; B29C 66/73921;
(Continued)

(56) References Cited

U.S. PATENT DOCUMENTS

| 4,237,363 A | * | 12/1980 | Lemelson | ............ | B23K 15/006 |
| | | | | | 219/121.14 |
| 2004/0089640 A1 | * | 5/2004 | Bager | ..................... | A61F 5/445 |
| | | | | | 219/121.64 |

(Continued)

FOREIGN PATENT DOCUMENTS

| EP | 0160425 A2 | 11/1985 |
| JP | 2002-292741 A | 10/2002 |

(Continued)

OTHER PUBLICATIONS

Extended European Search Report issued in corresponding European Application No. 15150497.4, dated May 11, 2015 (6 pages).

(Continued)

*Primary Examiner* — Maria V Ewald
*Assistant Examiner* — Michael Zhang
(74) *Attorney, Agent, or Firm* — Osha Liang LLP

(57) ABSTRACT

A resin-junction body includes a first resin member, a second resin member including a concave portion and laminated on the first resin member so as to contact the first resin member at a contact surface. The concave portion comprises a bottom face on a first resin member side. The resin-junction body further includes a joining layer that joins the first resin member and the second resin member and that extends from the bottom face towards the first resin member.

11 Claims, 11 Drawing Sheets

(51) Int. Cl.
  *B32B 38/04* (2006.01)
  *B32B 38/10* (2006.01)
  *C08J 5/12* (2006.01)
  *B29C 65/16* (2006.01)
  *B29C 65/00* (2006.01)
  *B32B 38/00* (2006.01)

(52) U.S. Cl.
  CPC ...... *B29C 65/1635* (2013.01); *B29C 65/1677* (2013.01); *B29C 66/02* (2013.01); *B29C 66/1122* (2013.01); *B29C 66/1142* (2013.01); *B29C 66/1162* (2013.01); *B29C 66/1312* (2013.01); *B29C 66/24221* (2013.01); *B29C 66/24244* (2013.01); *B29C 66/53461* (2013.01); *B29C 66/54* (2013.01); *B29C 66/73362* (2013.01); *B29C 66/73921* (2013.01); *B29C 66/81267* (2013.01); *B29C 66/81429* (2013.01); *B29C 66/8322* (2013.01); *B32B 37/18* (2013.01); *B32B 38/0008* (2013.01); *B32B 38/04* (2013.01); *B32B 38/10* (2013.01); *C08J 5/121* (2013.01); *B29C 65/1616* (2013.01); *B29C 65/1651* (2013.01); *B29C 66/02242* (2013.01); *B29C 66/21* (2013.01); *B29C 66/474* (2013.01); *B29C 66/71* (2013.01); *B29C 66/73365* (2013.01); *B29C 66/81261* (2013.01); *B29C 2793/0054* (2013.01); *B29C 2793/0081* (2013.01); *B29K 2995/0027* (2013.01); *B32B 2038/047* (2013.01); *B32B 2250/03* (2013.01); *C08J 2300/22* (2013.01); *Y10T 156/1056* (2015.01); *Y10T 156/1064* (2015.01); *Y10T 428/24612* (2015.01)

(58) Field of Classification Search
  CPC ........ B29C 66/53461; B29C 66/81261; B29C 66/02242; B29C 66/71; B29C 66/474; B29C 66/73365; B29C 66/21; B29C 65/1635; B29C 65/1677; B29C 65/1629; B29C 65/1612; B29C 793/0081; B29C 65/1616; B29C 65/1651; B29C 2793/0054; Y10T 156/1056; Y10T 156/1064; Y10T 428/24612; C08J 2300/22; B29K 2995/0027

See application file for complete search history.

(56) References Cited

U.S. PATENT DOCUMENTS

| 2007/0084552 | A1* | 4/2007 | Watanabe | ........... B29C 65/1635 156/272.8 |
| 2007/0137779 | A1* | 6/2007 | Mori | ................... B29C 65/5057 156/272.8 |
| 2008/0004363 | A1* | 1/2008 | Rosenberger | ............ C08K 3/32 522/2 |
| 2008/0176023 | A1* | 7/2008 | Bager | ................... B23K 26/18 428/98 |

FOREIGN PATENT DOCUMENTS

| JP | 2003-168313 A | 6/2003 |
| JP | 2004-158409 A | 6/2004 |
| JP | 2004-184848 A | 7/2004 |
| JP | 2005-219219 A | 8/2005 |
| JP | 2009-143190 A | 7/2009 |
| JP | 2010-253859 A | 11/2010 |
| JP | 2013-165027 A | 8/2013 |

OTHER PUBLICATIONS

Office Action in counterpart Japanese Application No. 2014-003711 dated Sep. 19, 2017 (9 pages).
Office Action in counterpart European Patent Application No. 15 150 497.4 dated Nov. 28, 2017 (4 pages).
Office Action in counterpart European Patent Application No. 15 150 497.4 dated Mar. 28, 2018 (5 pages).

* cited by examiner

Joining Progression
(Intermediate Stage)

Joining Progression (Completed Stage)

Second Example

Third Example

Fourth Example

Fifth Example

Sixth Example

RESIN-JUNCTION MATERIAL AND JOINING METHOD FOR RESIN MEMBER

TECHNICAL FIELD

The present invention relates generally to resin-junction materials and resin-member joining methods, and particularly to resin-junction materials welded together with resin members, and resin-member joining methods for welding resin members together.

BACKGROUND ART

A joining method for resin members to weld resin members together is known. (For example, see patent document 1.)

Disclosed in patent document 1 is a resin welding method for welding a first resin material that allows laser light to pass through, and a second resin material laminated to the first resin material, that absorbs and reflects laser light. With the resin-welding method described in patent document 1, initially, laser light that passes through the first resin material is radiated onto the second resin material when the first resin material and the second resin material are in a laminated state, thereby forming on the second resin material a deep-color portion having high-laser light absorbency. Thereafter, laser light is radiated onto the deep-color portion of the second resin material, thereby fusing the second resin material by that laser light being absorbed in the surrounding deep-color portion. With this configuration, the first resin material and the second resin material are welded.

PRIOR ART DOCUMENTS

Patent Documents

[Patent Document 1] Japanese unexamined patent application publication 2010-253859

However, the resin-welding method described in patent document 1 can be adopted if the first resin material has a quality to transmit laser light. Conversely, if the second resin material and the first resin material have a quality to absorb laser light, the laser light will be absorbed by the first resin material before radiating the second resin material. For that reason, if both the first resin material and the second resin material have the quality of absorbing the laser light, the first resin material and the second resin material will not adequately be joined (e.g., welded).

SUMMARY OF THE INVENTION

One or more embodiments of the present invention provide a resin-junction material that adequately joins (welds) the first resin material and the second resin material, and a joining method for resin members for adequately joining the first resin material and second resin material, even when the first resin material and the second resin material have the quality of absorbing laser light.

In one aspect, a resin-junction body according to one or more embodiments may comprise: a first resin member; a second resin member comprising a concave portion and laminated on the first resin member so as to contact the first resin member at a contact surface, wherein the concave portion comprises a bottom face on a first resin member side; and a joining layer that joins the first resin member and the second resin member and that extends from the bottom face towards the first resin member. For example, a resin-junction body according to one or more embodiments may comprise: a first resin member composed from a thermoplastic-resin material having relatively low optical transparency; a second resin member that includes a hole or a concave portion, welded to the first resin member in a welding region formed with the hole or the concave portion in a state laminated to the first resin member, composed of thermoplastic-resin material having a relatively low optical transparency; and a third resin member arranged in the hole or the concave portion of the second resin member, composed from a thermoplastic-resin material having a relatively higher optical transparency than the first resin member and the second resin member. Thermoplastic-resin material is broadly used herein to include, for example, not only a pure thermoplastic-resin, but also resin material that includes an additive to the thermoplastic-resin of the base material.

According to one or more embodiments, the third resin member may be composed of a thermoplastic-resin material having a relatively higher optical transparency than the first resin member and the second resin member is disposed in the hole or the concave portion of the second resin member. As a result, for example, it is possible to radiate light onto a surface of the first resin member laminated onto the second resin member, via the third resin member that has a relatively high optical transparency, arranged in the hole in the second resin member. Further, for example, it is possible to fuse at least the first resin member by light radiated onto a top face of the first resin member laminated onto the second resin member, being absorbed by the first resin member. The fusing region may widen via the third resin member, making it possible to weld the first resin member and the second resin member. Further, for example, when a concave portion is formed in the second resin member, it is possible to radiate light onto a bottom face of the first resin member side of the second resin member via the third resin member laminated in concave portion of the second resin member. As a result, for example, it is possible to fuse at least the second resin member by light radiated onto the bottom face of the first resin member side of the second resin member being absorbed by the second resin member. This makes it possible to weld the first resin member and the second resin member. As a result, for example, even if the first resin member and the second resin member both have a relatively low optical transparency and a property to absorb light, the first resin member and the second resin member can adequately be joined (e.g., welded).

With the resin-junction body according to one or more embodiments, for example, it is possible to inhibit heat generated by radiated infrared light from escaping from the hole or the concave portion by using the third resin member arranged at the hole or the concave portion in the second resin member, compared not to arranging anything in the hole or the concave portion. Furthermore, for example, it is possible adequately to conduct the heat necessary for fusing thermoplastic-resin material to the first resin member and the second resin member in the welding region in the circumference of the hole. As a result, the first resin member and the second resin member can securely be fused in the welding region. As a result, the first resin member and second resin member can adequately be joined (e.g., welded).

According to one or more embodiments, the thermoplastic-resin materials of the first resin member and the second resin member may be composed to have a relatively low optical transparency by a conductive additive being added. The first resin member and the second resin member may be arranged in a portion requiring conductivity in a predetermined electrical device. As a result, for example, it is possible easily to join (e.g., weld) the first resin member and the second resin member having conductivity imparted by the additive at portions that have conductivity in the predetermined electrical device.

According to one or more embodiments, a hole that penetrates the second resin member in a thickness direction may be formed in the welding region of the second resin member. In addition to the first resin member and the second resin member being welded in a state with the third resin member arranged in the hole, the first resin member and the third resin member may be welded, and the second resin member and the third resin member may be welded. As a result, for example, the first resin member and the second resin member are indirectly fastened via the third resin member by the third resin member being welded to the first resin member and the second resin member. Further, for example, it is possible more firmly to join the first resin member and the second resin member compared to only the first resin member and the second resin member being welded.

According to one or more embodiments, the second resin member and the third resin member arranged in the hole in the second resin member may be integrally formed by two-color molding. As a result, for example, it is possible easily to obtain the second resin member embedded with the third resin member in the hole, through two-color molding. Further, by integrally forming the second resin member and the third resin member, for example, it is possible to eliminate a process for arranging the second resin member in the hole, and it is possible to inhibit the third resin member from falling from the hole in the second resin member.

According to one or more embodiments, where the second resin member and the third resin member are integrally formed, the hole may be formed into a frame shape, and the third resin member may be formed into a frame shape that corresponds to the frame-like hole. As a result, for example, it is possible adequately to join (e.g., weld) the first resin member and the second resin member along the hole formed into a frame shape. Thus, for example, if a housing unit is formed to house a separate member inside the frame-shaped hole using the first resin member and the second resin member, it is possible to seal the outside of the housing unit in a frame shape. As a result, for example, airtightness of the housing unit is ensured by isolating the housing unit from the outside.

According to one or more embodiments, a hole that penetrates the second resin member in a thickness direction may be formed in the welding region of the second resin member. The third resin member may have a leaf spring that presses a face at an opposite side of the second resin member and the first resin member when arranged in the hole, when the first resin member and the second resin member are welded. As a result, for example, it is possible to press the second resin member to the first resin member via the leaf spring, so it is possible to press the second resin member to the first resin member. Further, for example, joining (e.g., welding) is possible in a state with improved adhesion of the first resin member and the second resin member, so a secure joint is possible for the first resin member and the second resin member.

According to one or more embodiments, a hole that penetrates the second resin member in a thickness direction may be formed in the welding region of the second resin member. The hole may be formed for the diameter to become smaller in a tapered shape toward the first resin member side. The third resin member may be formed to a tapered shape to correspond to the tapered hole. As a result, for example, it is possible to press the second resin member to the first resin member side via a face that is inclined in a tapered shape, simply by pressing the third resin member arranged in the hole of the second resin member to the first resin member side. Further, for example, joining (e.g., welding) is possible in a state with improved adhesion of the first resin member and the second resin member, so a secure joint is possible for the first resin member and the second resin member.

According to one or more embodiments, the thermoplastic-resin material of the first resin member, the second resin member, and the third resin member may contain the same thermoplastic-resin. As a result, for example, compared to a case in which various different thermoplastic-resins are included, it is possible to fuse either the first resin member, the second resin member, and the third resin member at a predetermined temperature, and to unify the degree of fusing. Further, for example, it is possible to join (e.g., weld) the first resin member and the second resin member by stably fusing the thermoplastic-resin material.

In another aspect, a joining method of a resin member according to one or more embodiments may comprise: laminating a first resin member and a second resin member both made of thermoplastic-resin material that absorbs light; forming a hole or a concave portion in the second resin member; arranging in the hole or the concave portion an optically transparent member that transmits light; and welding the first resin member and the second resin member by radiating light onto the first resin member side via the optically transparent member and fusing the thermoplastic-resin material of the first resin member and the second resin member at a welding region. For example, according to one or more embodiments, the method may comprise: preparing the first resin member composed from a thermoplastic-resin material having a relatively low optical transparency, and a second resin member composed from a thermoplastic-resin material having a relatively low optical transparency; forming a hole or a concave portion in the second resin member; laminating the first resin member and the second resin member; arranging in a hole or concave portion an optically transparent member having a relatively higher optical transparency than the first resin member and the second resin member; and welding the first resin member and the second resin member by fusing the thermoplastic-resin material of the first resin member and the second resin member in the welding region, by radiating light onto the first resin member side via the optically transparent member.

According to one or more embodiments, the method may comprise preparing in a hole or a concave portion the optically transparent member having a relatively higher optical transparency than the first resin member and the second resin member; and welding the first resin member and the second resin member by fusing the thermoplastic-resin material of the first resin member and the second resin member in the welding region by radiating light onto the first resin member side via the optically transparent member. As a result, for example, if a hole is formed in the second resin member, it is possible to radiate light onto the top face of the first resin member laminated onto the second resin member, via the optically transparent member that has a relatively high optical transparency, arranged in the hole in the second resin member. Further, for example, it is possible to fuse at least the first resin member by light radiated onto a top face of the first resin member laminated onto the second resin member, being absorbed by the first resin member. For that reason, the fusing region widens via the third resin member, making it possible to weld the first resin member and the second resin member. Further, for example, a concave portion may be formed in the second resin member, making it possible to radiate light onto the bottom face of the first resin member side of the second resin member via the optically transparent member laminated in the concave portion of the second resin member. As a result, for example, it is possible to fuse at least the second resin member by light radiated onto the bottom face of the first resin member side of the second resin member being absorbed by the second resin member. Further, for example, it is possible to weld the first resin member and the second resin member. Further, for example, even if the first resin member and the second resin member both have a relatively low optical transparency and a property to absorb light, the first resin member and the second resin member can adequately be joined (e.g., welded).

According to one or more embodiments, for example, it is possible to weld the first resin member and the second resin member in a state with the optically transparent member arranged in the hole or the concave portion of the second resin member. As a result, for example, it is possible to inhibit heat generated by radiated light from escaping from the hole or the concave portion by using the optically transparent member, compared not to arranging anything in the hole or the concave portion. Furthermore, for example, it is possible adequately to transmit the heat necessary for fusing thermoplastic-resin material to the first resin member and the second resin member in the welding region in the circumference of the hole or concave portion. As a result, for example, the first resin member and the second resin member can securely be fused in the welding region, and the first resin member and second resin member can adequately be joined (e.g., welded).

According to one or more embodiments, preparing the first resin member and the second resin member may comprise preparing the first resin member and second resin member arranged in a portion that requires conductivity in a predetermined electrical device, and the first resin member and the second resin member may be composed of the thermoplastic-resin material to have a relatively low optical transparency by adding a conductive additive. As a result, for example, it is possible easily to join (e.g., weld) the first resin member and the second resin member having conductivity imparted by the additive at portions that have conductivity in the predetermined electrical device.

According to one or more embodiments, preparing the optically transparent member may include arranging in the hole or the concave portion the third resin member as the optically transparent member composed from a thermoplastic-resin material having a relatively higher optical transparency than the first resin member and the second resin member. According to one or more embodiments, welding the first resin member and the second resin member may include welding the first resin member and the third resin member and welding the second resin member and the third resin member, in addition to welding the first resin member and the second resin member. As a result, for example, the first resin member and the second resin member are indirectly fastened via the third resin member by the third resin member being welded to the first resin member and the second resin member. Further, for example, it is possible more firmly to join the first resin member and the second resin member compared to only the first resin member and the second resin member being welded.

According to one or more embodiments, preparing the optically transparent member may include arranging in the hole or the concave portion the optically transparent member having thermal conductivity without thermoplasticity. According to one or more embodiments, the method may comprise a process for removing the optically transparent member from the hole or the concave portion, after the process for welding the first resin member and the second resin member. As a result, for example, it is possible repeatedly to use the removed optically transparent member for a different resin-junction body or a different welding region, to reduce the number of components compared to when preparing the optically transparent member for each hole or concave portion.

Embodiments of the present invention provide a resin-junction body that adequately joins (welds) the first resin member and the second resin member, and a resin-member joining method for adequately joining the first resin member and second resin member, even if the first resin member and the second resin member have the property of absorbing laser light.

DETAILED DESCRIPTION OF EMBODIMENTS

Embodiments of the present invention will now be described with reference to the drawings.

FIRST EXAMPLE

A configuration of a projector 100 that uses a resin-junction body 1 according to one or more embodiments of the present invention will now be described with reference to FIGS. 1-3. The projector 100 is one example of a "predetermined electrical device" of the present invention.

Figure 1:
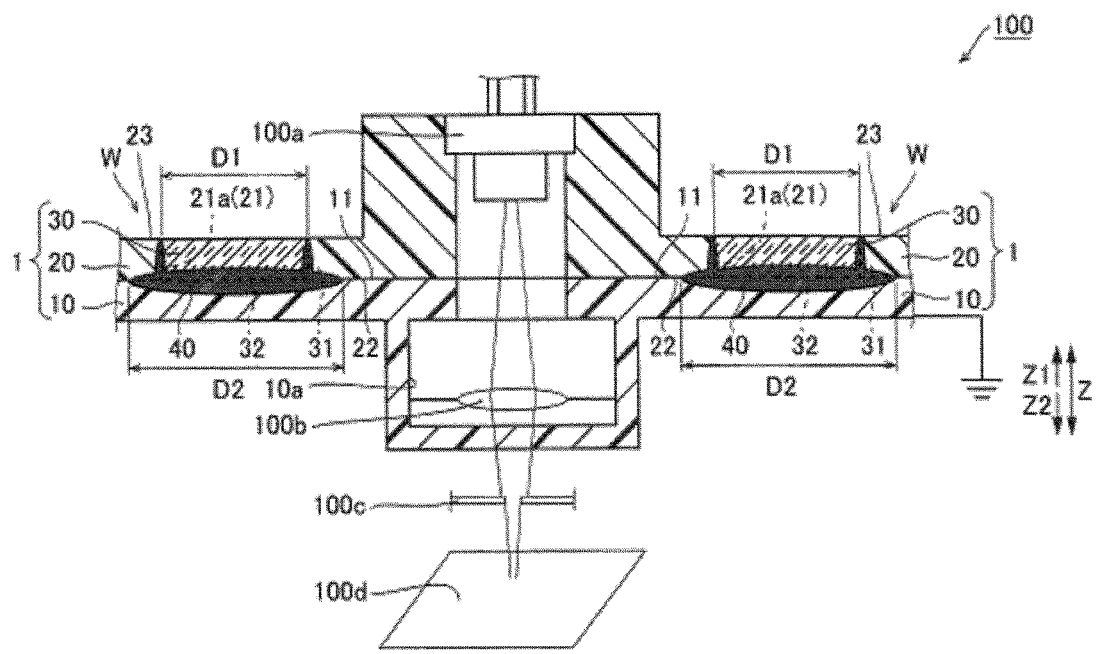
FIG. 1 is a schematic view of an entire configuration of a projector according to one or more embodiments of a first example of the invention.

As shown in FIG. 1, the projector 100 according to one or more embodiments of the first example may comprise a resin-junction body 1 that includes a main unit 10, a laser-fastening unit 20, and an optically transparent member 30; a laser diode (LD) 100*a* fastened to the laser-fastening unit 20 in the resin-junction body 1; and a lens 100*b* and a diaphragm 100*c* for dimming laser light from the LD 100*a*. The projector 100 radiates laser light onto a screen 100*d*. In the main unit 10, the lens 100*b* may be mounted to a lens-fastening unit 10*a* that transmits light from the LD 100*a*. In one or more embodiments, the main unit 10 and the laser-fastening unit 20 are joined (e.g., welded) with high precision so that the LD 100*a* and the lens 100*b* do not become mispositioned. The main unit 10, the laser-fastening unit 20, and the optically transparent member 30 are an example of the first resin member, the second resin member, and a third resin member of the present invention, respectively.

The main unit 10 and the laser-fastening unit 20 in the resin-junction body 1 may be composed of a thermoplastic-resin material with conductive carbon added to the thermoplastic-resin base material. The thermoplastic-resin base material may be PPS (polyphenylene sulfide). The main unit 10 and the laser-fastening unit 20 are conductive. Here, before carbon is added, optical transparency of pure PPS may be 20%-30% for infrared light with a wavelength of approximately 915 nm, while the optical transparency of PPS may be substantially 0% after carbon is added. Thermoplastic-resin material in the main unit 10 and the laser-fastening unit 20 with the conductive carbon added as an additive may both have low transmissivity of infrared light. PPS may have a certain degree of elasticity. Carbon is one example of an additive of the invention. Infrared light is one example of a predetermined light of the invention.

The main unit 10 and the laser-fastening unit 20 may function as a magnetic shield and ground to lighten an effect that external electromagnetic waves have on the LD 100*a*. The result is that these are arranged at portions (portions requiring conductivity) connected to the LD 100*a*.

A round hole 21 (see FIG. 2) may be formed in a planar view looking from a Z direction, in the laser-fastening unit 20. This hole 21 may be formed to penetrate the laser-fastening unit 20 in a thickness direction (Z direction). An optically transparent member 30 may be arranged in the hole 21 in the laser-fastening unit 20. This optically transparent member 30 may have a cylindrical shape, and substantially a same thickness as a thickness of the thickness direction (Z direction) of the hole 21, to correspond to the round shape of the hole 21 in the laser-fastening unit 20. A side face 31 of the optically transparent member 30 may be arranged to be close to an inner circumference face 21*a* of the hole 21. A hole diameter D1 of the hole 21 may be approximately 1.5 mm. The optically transparent member 30 may have a sectional shape of a diameter that is substantially the same as the hole diameter D1. A thickness t (see FIG. 3) in the thickness direction (Z direction) of the laser-fastening unit 20 and the optically transparent member 30 in a welding region W, may be approximately 1 mm.

Here, according to one or more embodiments, the optically transparent member 30 may be different from the main unit 10 and the laser-fastening unit 20 in that it does not include an additive such as carbon. It may be composed of pure PPS. In other words, while the optically transparent member 30 may be composed by a thermoplastic-resin that includes a thermoplastic-resin (PPS) that is the same as the main unit 10 and the laser-fastening unit 20, it may be composed so that its optical transparency is relatively higher than the main unit 10 and the laser-fastening unit 20. The result is that the main unit 10 and the laser-fastening unit 20 are constituted so that their optical transparencies are relatively lower than the optically transparent member 30.

According to one or more embodiments, the main unit 10 and the laser-fastening unit 20 may be joined by being welded in the welding region W in the resin junction body 1. Specifically, with the main unit 10 and the laser-fastening unit 20 close together in the thickness direction (Z direction), and the side face 31 of the optically transparent member 30 arranged close to the inner circumference face 21*a* in the hole 21, a top face 11 on the main unit 10 and a bottom face 22 of the laser-fastening unit 20 are welded, and the top face 11 on the main unit 10 and a bottom face 32 of the optically transparent member 30 are welded, and the inner circumference face 21*a* in the hole 21 in the laser-fastening unit 20, and the side face 31 of the optically transparent member 30 are welded. The result is that a weld portion 40 is formed in the welding region W, where the main unit 10, the laser-fastening unit 20, and the optically transparent member 30 are fused at a boundary face of the main unit 10, the laser-fastening unit 20 and the optically transparent member 30. This weld portion 40 firmly joins and fastens the main unit 10, the laser-fastening unit 20 and the optically transparent member 30. Further, the welding portion 40 may be formed to expand in a circular shape in a plane direction that intersects the thickness direction (Z direction), having a diameter D2 that is approximately 2 mm or more, and approximately 3 mm or less.

By forming this weld portion 40, a boundary need not be clearly confirmed at the top face 11 of the main unit 10 in the welding region W, the inner circumference face 21*a* in the hole 21 of the laser-fastening unit 20, the bottom face 22 of the laser-fastening unit 20, the side face 31 in the optically transparent member 30, and the bottom face 32 in the optically transparent member 30.

Next, a joining process of the resin-junction body 1 according to one or more embodiments of the first example will now be described with reference to FIGS. 1-5.

The following is an example. First, the main unit 10 and the laser-fastening unit 20 are prepared using thermoplastic-resin with carbon material added as an additive to the base material PPS which is a thermoplastic-resin, by integral molding or the like. When doing this, the hole 21 that penetrates the laser-fastening unit 20 in the thickness direction (Z direction) is formed at a predetermined position. This hole 21 may also be formed separately after forming the laser-fastening unit 20 through integral molding or the like. The optically transparent member 30 is formed into a cylindrical shape to correspond to the hole 21 using thermoplastic-resin material composed from thermoplastic-resin PPS.

Figure 2:
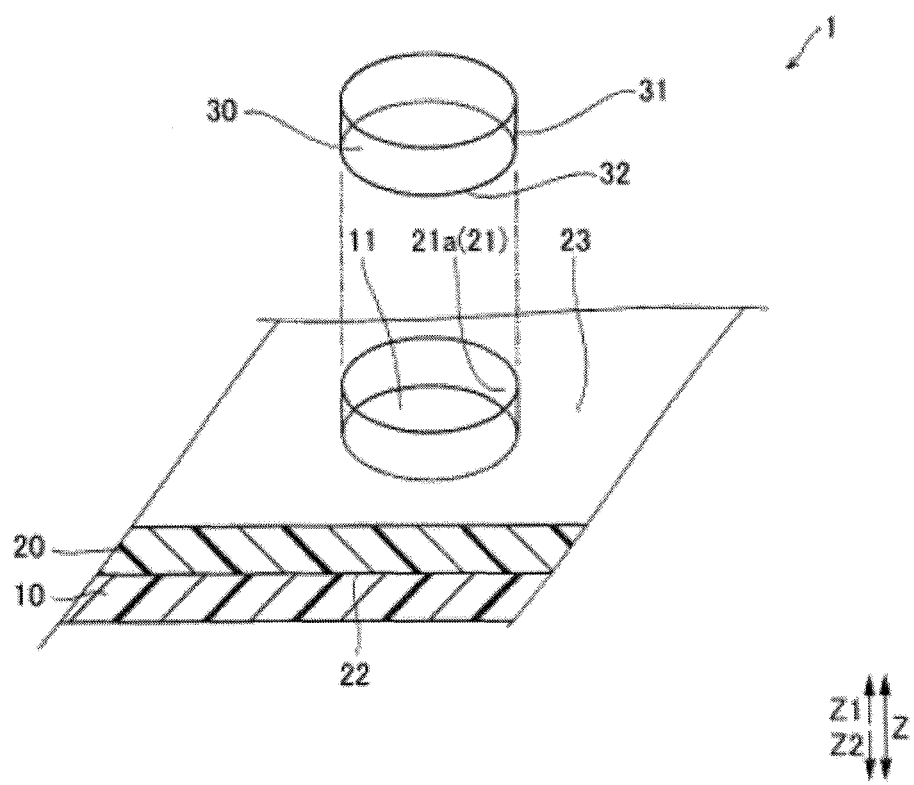
FIG. 2 is an exploded perspective view of a resin junction body according to the embodiment of the present invention.

Next, as shown in FIG. 2, the optically transparent member 30 is inserted into the hole 21 in the laser-fastening unit 20, when the main unit 10 and the laser-fastening unit 20 are laminated in the thickness direction so that the main unit 10 is positioned below (Z2 side). At this time, because PPS has a certain degree of elasticity, the optically transparent member 30 is arranged near the hole 21. Next, while constraining the optically transparent member 30 from coming out of the hole 21, a glass pressing member 50 having high-optical transparency capable of allowing almost all infrared light to pass therethrough is arranged to weld the main unit 10 and the laser-fastening unit 20 and to cover the optically transparent member 30 from above the top face 23 of the laser-fastening unit 20. By pressing the glass pressing member 50 to the laser-fastening unit 20 side (Z2 side), the main unit 10 and the laser-fastening unit 20 are joined, and the main unit 10 and the optically transparent member 30 are joined.

Next, in the joining process according to one or more embodiments of the first example, while pressing the glass pressing member 50 to the laser-fastening unit 20 side (Z2 side), infrared light having a wavelength of approximately 915 nm is radiated from above the pressing member 50, using an infrared-ray laser welding machine that radiates infrared laser light (infrared light). At this time, infrared light is radiated onto the top face 11 of the main unit 10 that corresponds to the position where the hole 21 of the laser-fastening unit 20 is formed, via the pressing member 50 and the optically transparent member 30. The infrared light is focused onto the top face 11 of the main unit 10, and a focal spot diameter D3 is set to approximately 0.6 mm.

Figure 3:
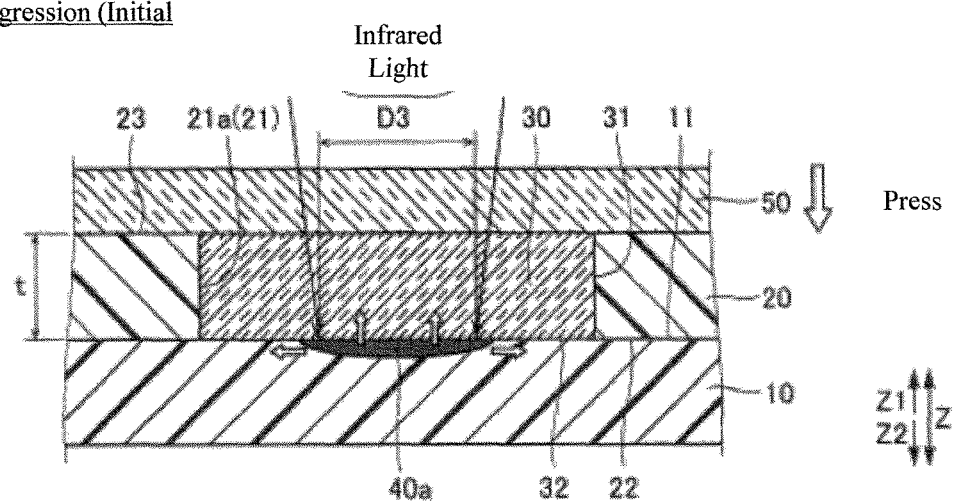
FIG. 3 is a sectional view of an initial stage of a joining process for the resin-junction body according to one or more embodiments of the first example.

As shown in FIG. 3, the carbon which is an additive in the main unit 10 absorbs the light and generates heat in a vicinity of the top face 11 of the main unit 10 that is being radiated by infrared light, thereby raising the temperature of the base material PPS to its melting point (approximately 280° C.). This fuses the vicinity of the top face 11 of the main unit 10 (initial stage).

Figure 4:
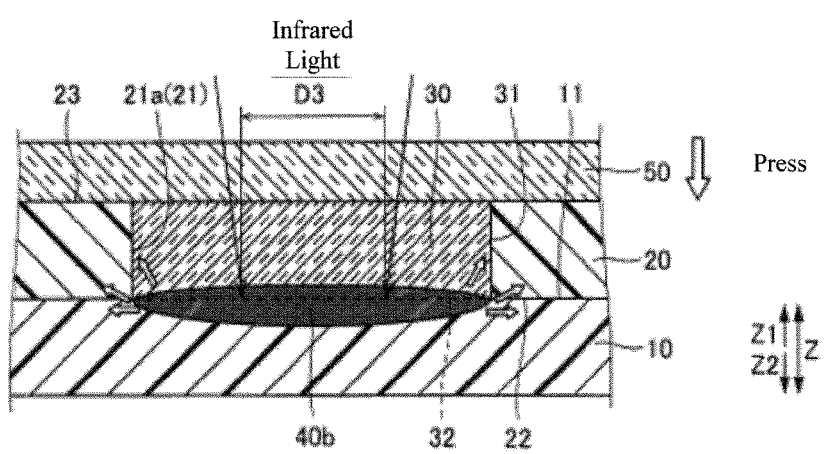
FIG. 4 is a sectional view of an intermediate stage of the joining process for the resin-junction body according to one or more embodiments of the first example.
Figure 5:
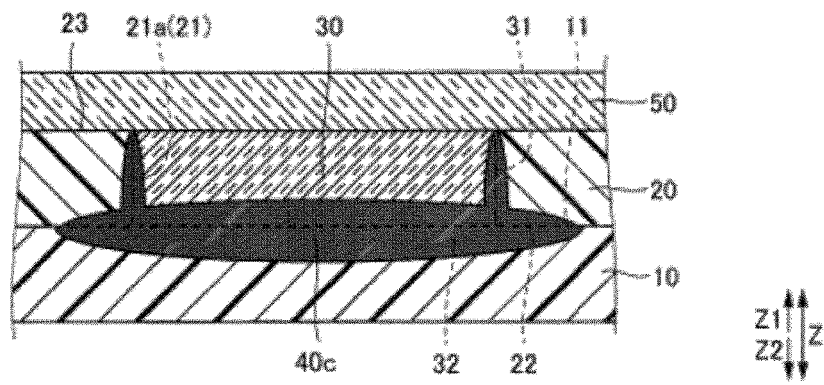
FIG. 5 is a sectional view of a completing stage of the joining process for the resin junction body according to one or more embodiments of the first example.

Heat (the white arrow) is transmitted to a circumference in a direction along a surface of the optically transparent member 30 (that is to be welded to the main unit 10) and a fused portion 40a on the main unit 10. As shown in FIG. 4, a fused portion 40b is formed that is larger than the fused portion 40a (intermediate stage), by fusing the bottom face 32 of the optically transparent member 30 to be welded to the main unit 10, and the circumference of the fused portion 40a on the main unit 10. Furthermore, heat (indicated by white arrows) from the fused portion 40b of the optically transparent member 30 and the main unit 10 is conducted to the side face 31 on the optically transparent member 30 and the inner circumference face 21a of the hole 21 in the laser-fastening unit 20. Heat is also conducted to the circumference of the fused portion 40b of the main unit 10, and to the bottom face 22 of the laser-fastening unit 20 in the circumference of the hole 21 that is to be welded to the top face 11 of the main unit 10. As shown in FIG. 5, the side face 31 in the optically transparent member 30 and the inner circumference face 21a in the hole 21 of the laser-fastening unit 20 become fused, and the circumference of the fused portion 40b on the main unit 10 and the bottom face 22 of the laser-fastening unit 20 in the circumference of the hole 21 also become fused, thereby forming a fused portion 40c that is larger than the fused portion 40b. (Completed stage)

Next, radiation of the infrared light is stopped. As a result, heat from the fused portion 40c is conducted to the main unit 10 in the circumference of the fused portion 40c, the laser-fastening unit 20, the optically transparent member 30, and the pressing member 50, thereby cooling the fused portion 40c. This results in the weld portion 40 being formed by the top face 11 of the main unit 10, and the bottom face 22 of the laser-fastening unit 20 being welded, the top face 11 of the main unit 10, and the bottom face 32 of optically transparent member 30 being welded, and the inner circumference face 21a in the hole 21 in the laser-fastening unit 20, and the side face 31 of the optically transparent member 30 being welded. Lastly, the resin junction body 1 shown in FIG. 1 is attained by removing the pressing member 50.

The following effects may be attained by one or more embodiments of the invention.

As described above, according to one or more embodiments, it is possible to radiate infrared light onto the top face 11 of the main unit 10 laminated onto the laser-fastening unit 20, via the optically transparent member 30 having a relatively high optical transparency, arranged in the hole 21 in the laser-fastening unit 20, by arranging in the hole 21 in the laser-fastening unit 20 the optically transparent member 30 having a relatively higher optical transparency than the main unit 10 and the laser-fastening unit 20. It is possible to fuse the main unit 10, the laser-fastening unit 20, and the optically transparent member 30 as a result of the main unit 10 absorbing the infrared light that is radiated onto the top face 11 of the main unit 10 laminated on the laser-fastening unit 20. For that reason, it is possible to weld the main unit 10, and the laser-fastening unit 20 by spreading the fusing range via the optically transparent member 30. The result is that even though the main unit 10 and the laser-fastening unit 20 both have relatively low optical transparency, and a light-absorbing quality, it is possible to adequately join (e.g., weld) the main unit 10 and the laser-fastening unit 20. Therefore, compared to joining using adhesive, it is possible to inhibit a weakening of the joint of the main unit 10, and the laser-fastening unit 20 which is caused by thermal expansion and thermal contraction of adhesive, and it is possible to reduce a subsequent process such as removing extruded adhesive. Further, a region for applying adhesive is unnecessary, so the resin-junction body 1 can be made that much more compact, and adhesive curing time can be eliminated thereby shortening production lead time.

Further, according to one or more embodiments, by arranging the optically transparent member 30 in the hole 21 of the laser-fastening unit 20, it is possible to use the optically transparent member 30 to inhibit heat generated by radiated infrared light from escaping from the hole 21, when compared not to arranging anything in the hole 21. Still further, it is possible adequately to conduct the heat necessary for fusing thermoplastic-resin material to the main unit 10, and the laser-fastening unit 20 in the welding region W in the circumference of the hole 21, via the optically transparent member 30. For that reason, the main unit 10, and the laser-fastening unit 20 can securely be fused in the welding region W. As a result, the main unit 10 and the laser-fastening unit 20 can adequately be joined (e.g., welded).

Further, according to one or more embodiments, conductive carbon is added as an additive to constitute the thermoplastic-resin materials of both the main unit 10, and the laser-fastening unit 20 to have a low-infrared light transparency quality. Further, the main unit 10 and the laser-fastening unit 20 are arranged at portions of the LD 100a of the projector 100 that require conductivity. As a result, it is possible to join (e.g., weld) the main unit 10 and laser-fastening unit 20 having conductivity imparted by the additive (carbon), at portions of the LD 100a of the projector 100 that have conductivity.

Further, according to one or more embodiments, the top face 11 of the main unit 10 and the bottom face 22 of the laser-fastening unit 20 are welded, the top face 11 of the main unit 10 and the bottom face 32 of the optically transparent member 30 are welded, and the inner circumference face 21a in the hole 21 in the laser-fastening unit 20, and the side face 31 of the optically transparent member 30 are welded, in a state where the side face 31 of the optically transparent member 30 is arranged to be welded to the inner circumference face 21a of the hole 21. As a result, it is possible to indirectly fasten the main unit 10 and the laser-fastening unit 20 via the optically transparent member 30 by the optically transparent member 30 being welded to the main unit 10 and the laser-fastening unit 20. As a result, it is possible to more firmly join the main unit 10 and the laser-fastening unit 20 compared to welding only the main unit 10 and the laser-fastening unit 20.

Further, according to one or more embodiments, by including the same thermoplastic-resin material (PPS) for each of the main unit 10, the laser-fastening unit 20, and the optically transparent member 30, it is possible to fuse either of the main unit 10, the laser-fastening unit 20, and the optically transparent member 30 at a predetermined temperature, and to join (e.g., weld) the main unit 10 and the laser-fastening unit 20 by stably fusing the thermoplastic-resin material, compared to a case where each includes a different thermoplastic-resin.

SECOND EXAMPLE

Next, embodiments of a second example will be described with reference to FIGS. 6-8. According to one or more embodiments, a frame-like optically transparent member 230 may be arranged in a frame-like hole 221 in a planar view, which is different from embodiments of the first example that arrange the cylindrical optically transparent member 30 in the round hole 21 in the planar view. Further, the same symbols are applied to the same or similar components as described in the first example. Explanations thereof will be omitted. Further, the optically transparent member 230 is one example of a third resin member of the present invention.

Figure 6:
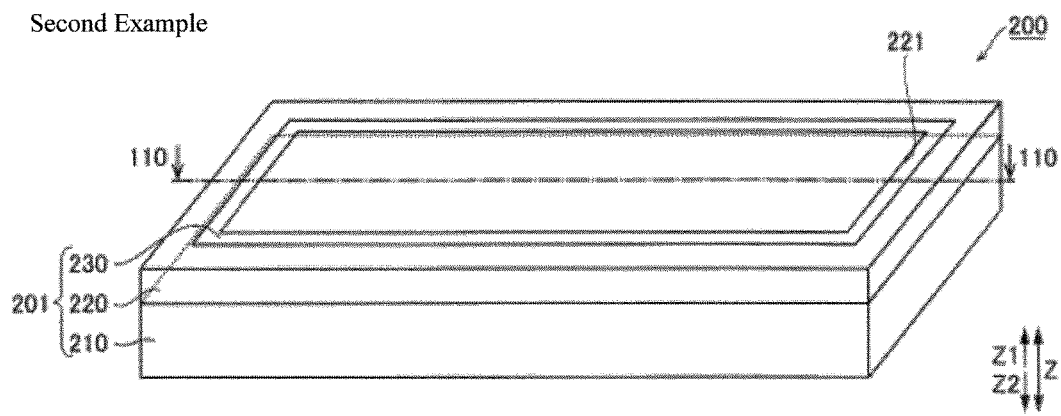
FIG. 6 is a perspective view of an airtight sealing member according to one or more embodiments of a second example of the present invention.
Figure 7:
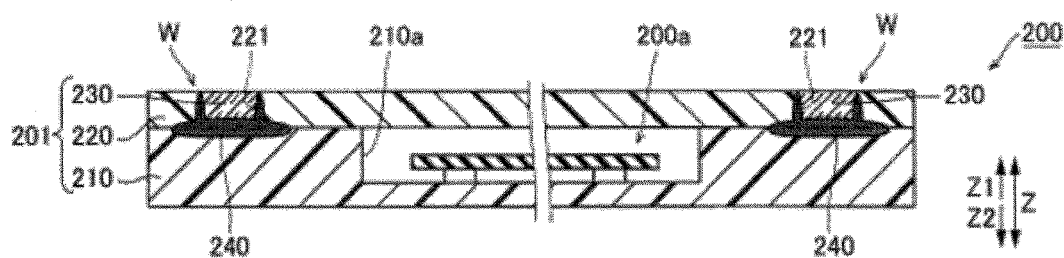
FIG. 7 is a sectional view along line 110-110 in FIG. 6.

As shown in FIGS. 6 and 7, an airtight sealing member 200 according to one or more embodiments of the second example may comprise a box-like main unit 210; a resin-junction body 201 that includes a plate-shaped cover 220, and the optically transparent member 230; and an electronic component 200a (see FIG. 7) arranged in a housing unit 210a (see FIG. 7) in the main unit 210. Further, with the airtight sealing member 200, the housing unit 210a arranged with the electronic component 200a is sealed airtight by the resin-junction body 201. Further, the main unit 210 and the cover 220 are an example of the first resin member and the second resin member of the invention, respectively.

Here, according to one or more embodiments, the cover 220 of the resin-junction body 201 may include a hole 221 formed into a rectangular frame shape in a planar view seen from the Z direction. Further, the hole 221 may be formed to penetrate the thickness direction (Z direction) of the cover 220. Further, the optically transparent member 230 formed into a rectangular frame shape to correspond to the hole 221 formed into a rectangular frame shape may be arranged in the hole 221. Further, the cover 220, and the optically transparent member 230 arranged in the hole 221 may be integrally formed by two-color molding.

Further, the main unit 210 and the cover 220 may be composed by thermoplastic-resin material with conductive carbon added to the base material; they may be conductive; the base material may be PPS. Specifically, conductive carbon may be added as an additive, so the thermoplastic-resin materials in both the main unit 210 and the cover 220 have a property of low infrared-light transmissivity. Conversely, the optically transparent member 230 does not include an additive such as carbon, by contrast with the main unit 210 and the cover 220; it may be composed of pure PPS. The result is that the optically transparent member 230 is composed by a thermoplastic-resin that includes thermoplastic-resin (PPS) that is the same as the main unit 210 and the cover 220, while its optical transparency is relatively higher than the main unit 210 and the cover 220.

Further, the main unit 210 and the cover 220 may be constituted to function as a magnetic shield and a ground to lighten an effect of external electromagnetic waves have on the electronic component 200a. The result is that they are arranged in portions (portions that require conductivity) connected to the electronic component 200a.

Further, according to one or more embodiments, the main unit 210 and the cover 220 may be joined by being welded across an entire circumference of the hole 221, and the optically transparent member 230, arranged in a frame shape, in the resin-junction body 201. In other words, in the same way as one or more embodiments of the first example, a weld portion 240 may be formed that fuses the main unit 210, the cover 220, and the optically transparent member 230 at a boundary face of the main unit 210, the cover 220, and the optically transparent member 230, in the frame-shaped welding region W. This weld portion 240 firmly joins and fastens the main unit 210, the cover 220, and the optically transparent member 230.

Next, a joining process of the resin-junction body 201 according to one or more embodiments of the second example will now be described with reference to FIGS. 6-8.

The following is an example. First, the main unit 210 is created using thermoplastic-resin material added with carbon as an additive to the thermoplastic-resin base material PPS, by integral molding or the like. Further, the cover 220, and the optically transparent member 230 are integrally formed by two-color molding. Specifically, the plate-shaped cover 220 is created to form the rectangular frame-like hole 221, by flowing thermoplastic-resin material with carbon added to the base material PPS, into a predetermined mold. Thereafter, the optically transparent member 230 is integrally formed on the cover 220 in the rectangular frame-like hole 221, by flowing into the hole 221 thermoplastic-resin material composed of the thermoplastic-resin PPS.

Figure 8:
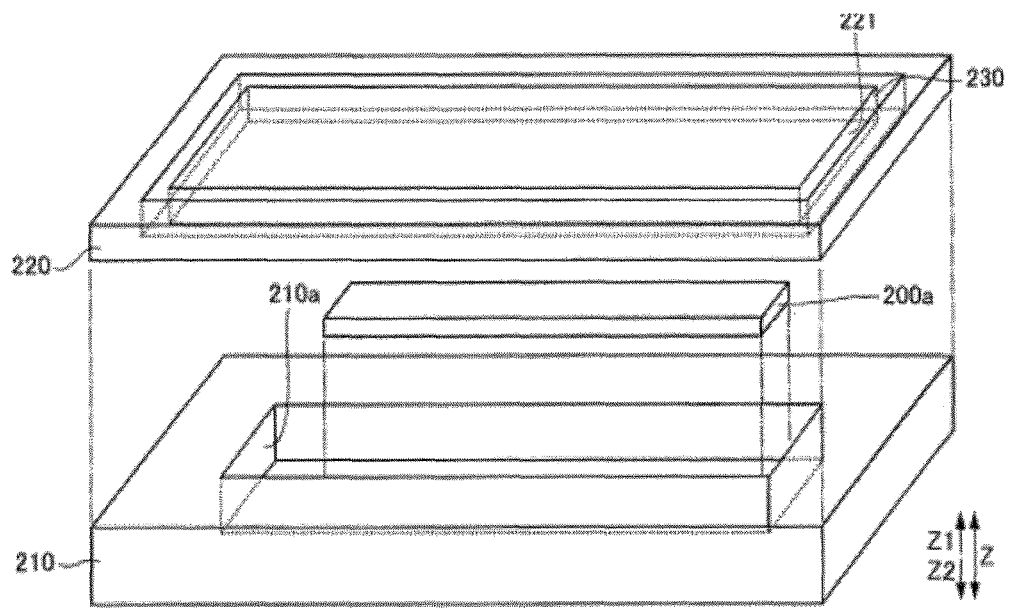
FIG. 8 is a view for explaining a resin-junction body joining process according to one or more embodiments of the second example.

Further, with the electronic component 200a arranged in the housing unit 210a of the main unit 210, the main unit 210 and the cover 220 are laminated in the thickness direction (Z direction) so that the cover 220 covers the housing unit 210a, as shown in FIG. 8. Next, a glass pressing member (not shown in the drawing) having high-optical transparency capable of allowing almost all infrared light to pass therethrough is arranged on the cover 220, so as to weld the main unit 210 and the cover 220. Further, by pressing the glass pressing member to the cover 220 side (Z2 side), the main unit 210 and the cover 220 are welded. Further, in the same way as according to one or more embodiments, infrared light is used to weld across the entire circumference of the hole 221 arranged in a frame shape, and the optically transparent member 230. As a result, the weld portion 240 is formed fusing the main unit 210, the cover 220, and the optically transparent member 230 at a boundary face of the main unit 210, the cover 220, and the optically transparent member 230, in the frame-shaped welding region W, thereby attaining the resin-junction body 201 and the airtight sealing member 200 shown in FIGS. 6 and 7.

The following effects are attained by one or more embodiments.

According to one or more embodiments, as described above, by arranging in the hole 221 of the cover 220 the optically transparent member 230 having a relatively higher optical transparency than the main unit 210 and the cover 220, it is possible to attain an adequate joint (weld) of the main unit 210 and the cover 220, even if the main unit 210 and the cover 220 both have relatively low optical transparency, and a property to absorb light.

Also according to one or more embodiments, by integrally forming the cover 220 and the optically transparent member 230 arranged in the hole 221 using two-color molding, it is possible to attain the cover 220 with the optically transparent member 230 embedded in the hole 221, using two-color molding. Also by integrally forming the cover 220 and the optically transparent member 230, it is possible to eliminate a process for arranging the optically transparent member 230 in the hole 221, and it is possible to inhibit the optically transparent member 230 from falling from the hole 221 in the cover 220.

Also according to one or more embodiments, by forming the optically transparent member 230 into a rectangular frame shape to correspond to the hole 221 formed into the rectangular frame shape, it is possible to adequately join (e.g., weld) the main unit 210 and the cover 220 along the frame-shaped hole 221, so it is possible to seal the outside of the housing unit 210a in a frame shape. As a result, airtightness of the housing unit 210a is ensured by isolating the housing unit 210a from the outside. Other effects of the second example may be the same as those described for the first example.

THIRD EXAMPLE

Next, one or more embodiments of a third example will be described with reference to FIGS. 9-11. According to one or more embodiments, a leaf spring 335 may be disposed on an optically transparent member 330, in addition to the configuration of the embodiments of the first example described above. Further, the same symbols are applied to the same or similar components as described in the first example, and their explanations will be omitted. Further, the optically transparent member 330 is an example of a third resin member of the present invention.

Figure 9:
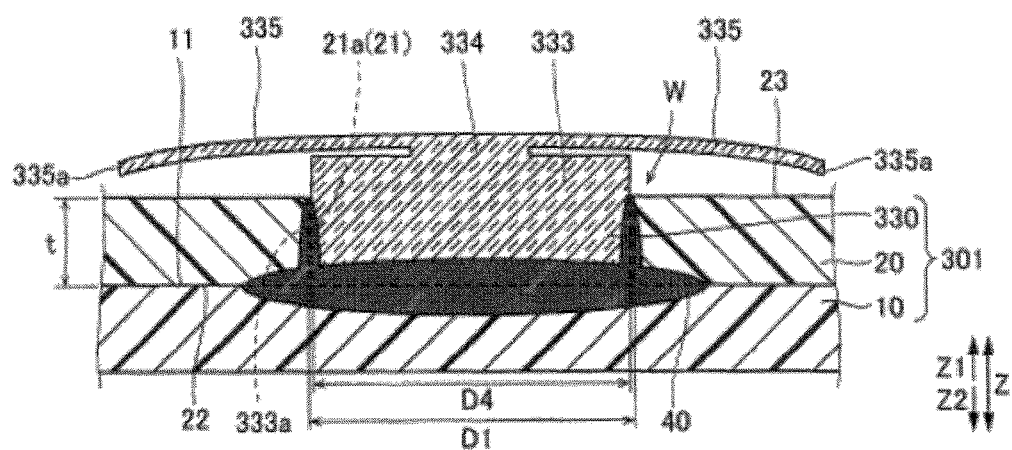
FIG. 9 is a perspective view of a resin junction body according to one or more embodiments of a third example of the present invention.

As shown in FIG. 9, the optically transparent member 330 in a resin junction body 301 according to one or more embodiments of the third example may have a cylindrically shaped main unit 333 to correspond to the round shape of the hole 21 in the laser-fastening unit 20. Further, the main unit 333 may be formed to be larger in the thickness direction than the thickness t in the thickness direction (Z direction) of the hole 21, which is different from the optically transparent member 30 in the first example described above. Specifically, the main unit 333 of the optically transparent member 330 may project from the hole 21 to the Z1 side, in a state where it is arranged in the hole 21. Further, the main unit 333 may be formed to have a sectional shape with a slightly smaller diameter D4 than the hole diameter D1 of the hole 21. A gap (D1-D4/2) between the inner circumference face 21a of the hole 21 and the side face 333a of the main unit 333 may be approximately 0.1 mm or lower.

Figure 10:
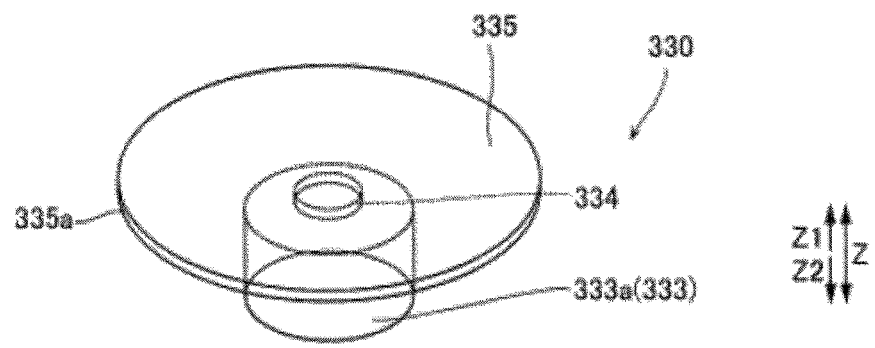
FIG. 10 is a perspective view of an optically transparent member according to one or more embodiments of the third example.
Figure 11:
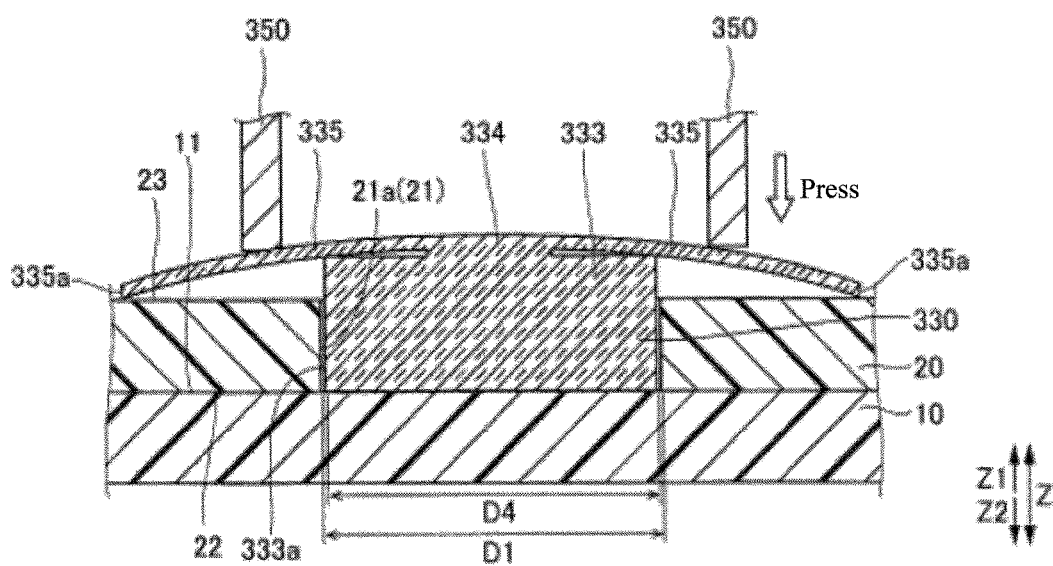
FIG. 11 is a view for explaining a resin-junction body joining process according to one or more embodiments of the third example.

Here, according to one or more embodiments, a cylindrical projection 334 that projects upward from a top face (a face at the Z1 side) of the main unit 333 and the leaf spring 335 may be disposed at a top portion (the portion at the Z1 side) of the main unit 333 on the optically transparent member 330, as shown in FIG. 10. This leaf spring 335 may extend to project from an outer circumference face of the projection 334, and be formed into an umbrella shape to cover a top of the main unit 333. The result is the leaf spring 335 being formed into a circle in the planar view looking from the Z direction. Further, the projection 334 and leaf spring 335 may be disposed as one body on the main unit 333. Because PPS that composes the optically transparent member 330 (main unit 333) has a certain degree of elasticity, the leaf spring 335 may also have a certain degree of elasticity.

Further, as shown in FIG. 9, in the same way as one or more embodiments of the first example, a weld portion 40 may be formed that fuses the main unit 10, the cover 20, and the optically transparent member 330 at a boundary face of the main unit 10, the laser-fastening unit 20, and the optically transparent member 330, in the welding region W. Further, other configurations of the third example may be the same as the first example.

Next, a joining process of the resin-junction body 301 according to one or more embodiments of the third example will be described with reference to FIGS. 9-11.

The following is an example. First, the main unit 10 and the laser-fastening unit 20 are created in the same way as one or more embodiments of the first example. Further, as shown in FIG. 10, the optically transparent member 330 is integrally formed through resin molding using thermoplastic-resin PPS to include the main unit 333 formed to be cylindrically shaped to correspond to the hole 21, the cylindrically shaped projection 334 that projects upward from the top face (face at the Z1 side) of the main unit 333, and the umbrella-shaped leaf spring 335 that extends projecting from the outside circumference face of the projection 334, and covers the top of the optically transparent member 330.

Further, with the main unit 10 and the laser-fastening unit 20 laminated in the thickness direction so that the main unit 10 is positioned at the Z2 side, the main unit 333 of the optically transparent member 330 is arranged in the hole 21 of the laser-fastening unit 20. Next, a predetermined jig 350 is used to press the leaf spring 335 of the optically transparent member 330 to the laser-fastening unit 20 side (Z2 side), as shown in FIG. 11. At this time, elastic deformation of the leaf spring 335 presses a top face 23, by touching an outer edge portion 335a of the leaf spring 335 to a top face 23 of the laser-fastening unit 20. As a result, using the jig 350, the main unit 10 and the laser-fastening unit 20 are welded via the leaf spring 335, without the main unit 10 and the optically transparent member 330 being welded. Further, while maintaining the state where the top face 23 of the laser-fastening unit 20 is being held by the leaf spring 335, welding is performed using infrared light in the same way as in the first example. As a result, the weld portion 40 that fuses the main unit 10, the laser-fastening unit 20, and the optically transparent member 330 are formed at the boundary face of the main unit 10, the laser-fastening unit 20, and the optically transparent member 330, thereby attaining the resin-junction body 301 shown in FIG. 9.

The following effects are attained by one or more embodiments.

According to one or more embodiments, as described above, by arranging in the hole 21 of the laser-fastening unit 20 the optically transparent member 330 having a relatively higher optical transparency than the main unit 10 and the laser-fastening unit 20, it is possible to attain an adequate joint (weld) of the main unit 10 and the laser-fastening unit 20, even if the main unit 10 and the laser-fastening unit 20 both have relatively low optical transparency, and a property to absorb light in the same way as the first example described above.

Further, according to one or more embodiments, while maintaining the state where the top face 23 of the laser-fastening unit 20 is being pressed by the leaf spring 335, welding is performed using infrared light to form the weld portion 40 at the boundary face of the main unit 10, the laser-fastening unit 20, and the optically transparent member 330. As a result, it is possible to push the laser-fastening unit 20 to the main unit 10 simply by pushing to the main unit 10 the optically transparent member 330 arranged in the hole 21 of the laser-fastening unit 20, because the laser-fastening unit 20 can be pushed to the main unit 10 side via the leaf spring 335. As a result, joining (e.g., welding) is possible in a state with improved adhesion of the main unit 10 and the laser-fastening unit 20, so a secure joint is possible for the main unit 10 and the laser-fastening unit 20. Other effects of the third example may be the same as those described for the first example.

FOURTH EXAMPLE

Next, a fourth embodiment will be described with reference to FIGS. 12-14. According to one or more embodiments, a hole 421 and an optically transparent member 430 may be formed into tapered shapes, in addition to the configuration of the embodiments of the first example described above. Further, the same symbols are applied to the same or similar components as described in the first example. Explanations thereof will be omitted. Further, the optically transparent member 430 is an example of a third resin member of the present invention.

Figure 12:
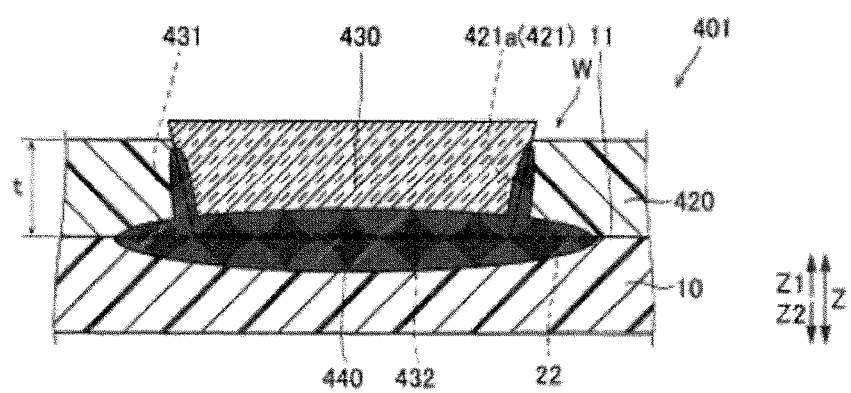
FIG. 12 is a perspective view of a resin-junction body according to one or more embodiments of a fourth example of the present invention.
Figure 13:
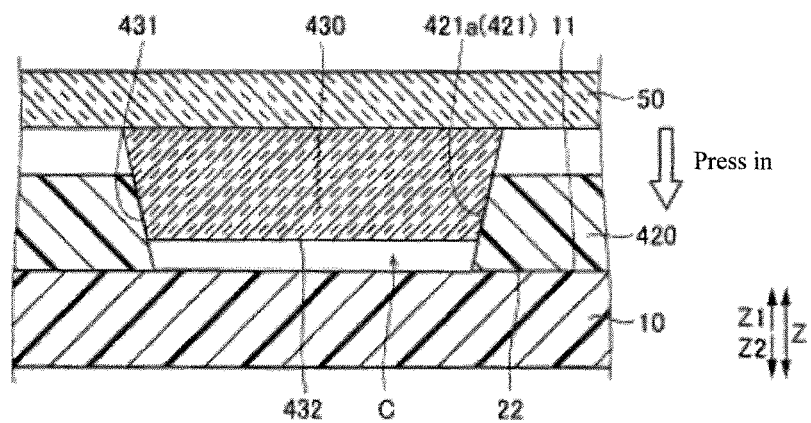
FIG. 13 is a view for explaining a resin-junction body joining process according to one or more embodiments of the fourth example.

The hole 421 in a laser-fastening unit 420 of the resin-junction body 401 according to one or more embodiments of the fourth example may be formed into a tapered shape so that the diameter continually decreases from the Z1 side toward the Z2 side (main unit side), as shown in FIG. 12. Specifically, the inner circumference face 421a of the hole 421 may be formed to be inclined to a center of the hole 421 from the Z1 side to the Z2 side. Further, the laser-fastening unit 420 is an example of the second resin member of the present invention.

Further, the optically transparent member 430 may be formed to a tapered shape so that an outer diameter continually becomes smaller from the Z1 side to the Z2 side. Specifically, the inner face 431 of the optically transparent member 430 may be formed to be inclined to a center of the optically transparent member 430 from the Z1 side to the Z2 side. Further, the optically transparent member 430 may be formed into a tapered shape to correspond to the tapered hole 421. Further, the optically transparent member 430 may be formed into a tapered shape to be slightly larger than the tapered hole 421.

Further, the main unit 430 may be formed to be larger in the thickness direction than the thickness t in the thickness direction (Z direction) of the hole 421, which is different from the optically transparent member 30 in the first example described above. Specifically, the optically transparent member 430 may project from the hole 421 to the Z1 side, when it is arranged in the hole 421.

Further, a weld portion 440 may be formed in the welding region W, where the main unit 10, the laser-fastening unit 420, and the optically transparent member 430 are fused at a boundary face of the main unit 10, the laser-fastening unit 420, and the optically transparent member 430. Further, other configurations of the fourth example may be the same as the first example.

Next, a joining process of the resin-junction body 401 according to one or more embodiments of the fourth example will now be described with reference to FIGS. 12-14.

The following is an example. First, in the same way as one or more embodiments of the first example, the main unit 10 is formed and the laser-fastening unit 420 is formed to include the tapered hole 421 that penetrates in the thickness direction (Z direction) at a predetermined position. Further, the optically transparent member 430 is formed into a tapered shape to correspond to the tapered hole 421. The optically transparent member 430 is formed into a tapered shape to be slightly larger than the tapered hole 421.

Then, with the main unit 10 and the laser-fastening unit 420 laminated in the thickness direction so that the main unit 10 is positioned at the Z2 side, the optically transparent member 430 is arranged in the hole 421 of the laser-fastening unit 420. At this time, as shown in FIG. 13, a gap C is formed between a bottom face 432 of the optically transparent member 430 and the top face 11 of the main unit 10, without arranging the entire optically transparent member 430 in the hole 421, because the optically transparent member 430 is formed into a tapered shape that is slightly larger than the tapered hole 421.

Next, with the glass pressing member 50 that has a high optical transparency arranged on the top face (a face at the Z1 side) of the optically transparent member 430, the glass pressing member 50 is pressed to the laser-fastening unit 420 side (Z2 side). As a result, the optically transparent member 430 having a certain degree of elasticity is pushed into the hole 421 by the pressing force from the pressing member 50. At this time, force is applied, via the side face 431 in the optically transparent member 430, that presses into the main unit 10 side (Z2 side) the laser-fastening unit 420 in the inner circumference face 421a of the hole 421 in the laser-fastening unit 420.

Figure 14:
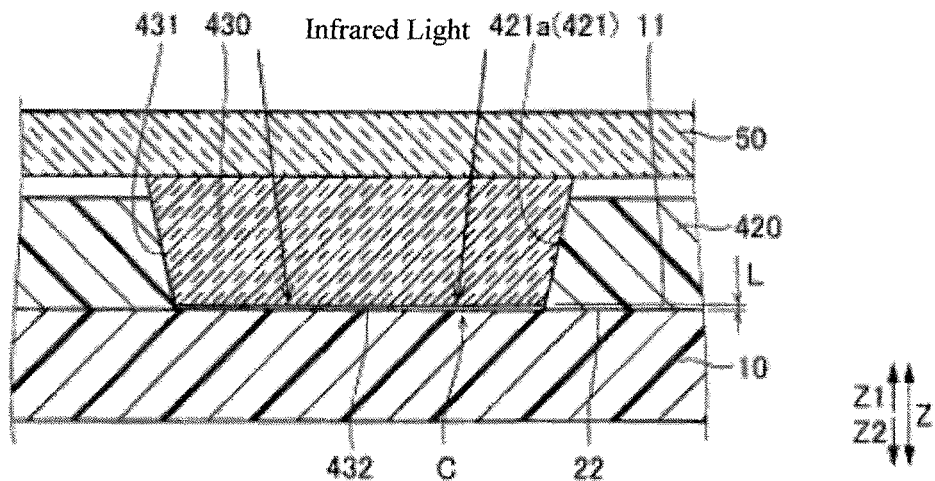
FIG. 14 is a view for explaining a resin-junction body joining process according to one or more embodiments of the fourth example.

As a result, as shown in FIG. 14, the optically transparent member 430 is pressed into the hole 421 of the laser-fastening unit 420 so that a length L in the thickness direction of the gap C between the bottom face 432 in the optically transparent member 430 and the top face 11 of the main unit 10 is, e.g., approximately 0.1 mm or lower, and the main unit 10 and the laser-fastening unit 420 are welded. Then, in the same way as one or more embodiments of the first example, the glass pressing member 50 is pressed to the laser-fastening unit 420 side (Z2 side), and welding is performed using infrared light. Further, another joining process of the fourth example may be the same as the first example.

The following effects are attained by one or more embodiments.

According to one or more embodiments, as described above, by arranging in the hole 421 of the laser-fastening unit 420 the optically transparent member 430 having a relatively higher optical transparency than the main unit 10 and the laser-fastening unit 420, it is possible to attain an adequate joint (weld) of the main unit 10 and the laser-fastening unit 420, even if the main unit 10 and the laser-fastening unit 420 both have relatively low optical transparency, and a property to absorb light in the same way as the first example described above.

Further, according to one or more embodiments, the hole 421 is formed in a laser-fastening unit 420 into a tapered shape so that the diameter continually decreases from the Z1 side toward the Z2 side (main unit side), and the optically transparent member 430 is formed into a tapered shape to correspond to the tapered hole 421. As a result, it is possible to press the laser-fastening unit 420 to the main unit 10 side via a face that is inclined in a tapered shape (the inner circumference face 421a of the hole 421, and the side face 431 of the optically transparent member 430) simply by pressing the optically transparent member 430 arranged in the hole 421 of the laser-fastening unit 420 to the main unit 10 side. As a result, joining (e.g., welding) is possible in a state with improved adhesion of the main unit 10 and the laser-fastening unit 420, so a secure joint is possible for the main unit 10 and the laser-fastening unit 420. Other effects of the fourth example may be the same as those described for the first example.

Fifth Example

Next, embodiments of a fifth example will now be described with reference to FIGS. 15-16. According to one or more embodiments, a concave portion 521 that penetrates a laser-fastening unit 520 is used instead of the hole 21 that penetrates the laser-fastening unit 20 in the first example described above. Further, the same symbols are applied to the same or similar components as described in the first example. Explanations thereof will be omitted. Further, the laser-fastening unit 520 is an example of the second resin member of the present invention.

Figure 15:
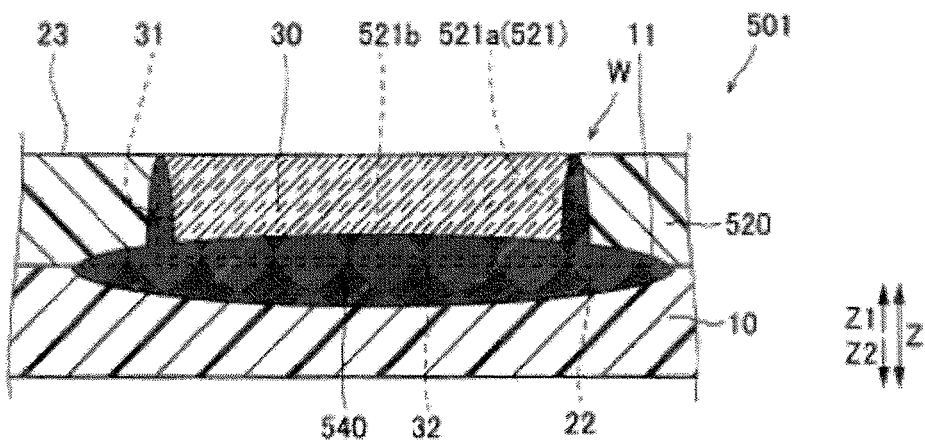
FIG. 15 is a perspective view of a resin-junction body according to one or more embodiments of a fifth example of the present invention.

The round concave portion 521 may be formed in a planar view seen from the Z direction, as shown in FIG. 15, in the laser-fastening unit 520 of a resin-junction body 501 according to one or more embodiments of the present invention. A depth H (see FIG. 16) of the concave portion 521 may be slightly smaller than a thickness t (see FIG. 16) of the laser-fastening unit 520. Specifically, the concave portion 521 may be formed not to penetrate the thickness direction (Z direction). A bottom face 521b on the main unit 10 side (Z2 side) of the concave portion 521 may be formed in the vicinity of the top face 11 of the main unit 10. Further, the cylindrical optically transparent member 30 may be arranged in the concave portion 521. The bottom face 32 of the optically transparent member 30 may touch or contact the bottom face 521b of the concave portion 521.

Further, a weld portion 540 may be formed in the welding region W, where the main unit 10 and the laser-fastening unit 520 are fused at a boundary face of the main unit 10 and the laser-fastening unit 520. Further, the weld portion 540 may be formed at the boundary face of the inner circumference (side face 521a and bottom face 521b) of the concave portion 521 in the laser-fastening unit 520 and the side face 31 of the optically transparent member 30. Other configurations of the fifth example may be the same as the first example.

Next, a joining process of the resin junction body 501 according to one or more embodiments of the fifth example will be described with reference to FIGS. 15 and 16.

The following is an example. First, in the same way as one or more embodiments of the first example, the main unit 10 and the optically transparent member 30 are created, and the laser-fastening unit 520 is created to include the concave portion 521 that does not penetrate the thickness direction (Z direction) at a predetermined position.

Figure 16:
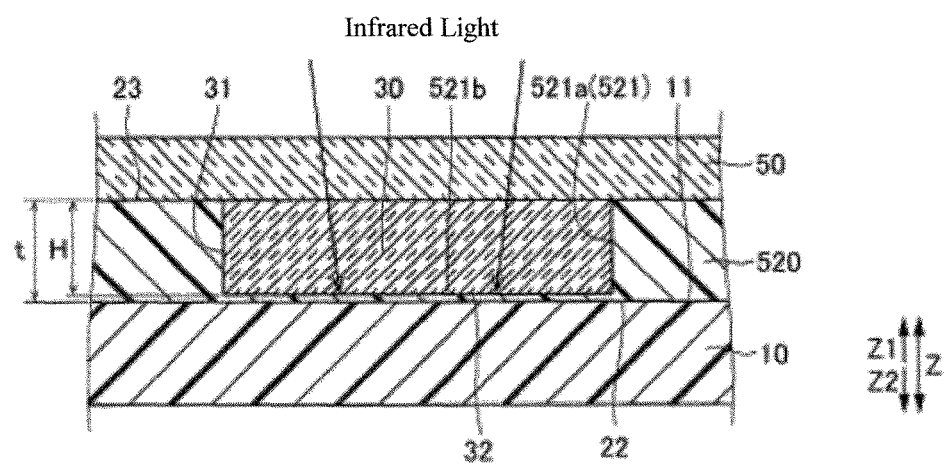
FIG. 16 is a view for explaining a resin-junction body joining process according to one or more embodiments of the fifth example.

Then, the optically transparent member 30 is inserted into the concave portion 521 of the laser-fastening unit 520 with the main unit 10 and the laser-fastening unit 520 laminated in the thickness direction so that the main unit 10 is positioned at the Z2 side, as shown in FIG. 16. Next, the glass pressing member 50 having a high optical transparency is arranged to cover the optically transparent member 30 from above the top face 23 of the laser-fastening unit 520. Then, by pressing the glass pressing member 50 to the laser-fastening unit 520 side (Z2 side), the main unit 10 and the laser-fastening unit 520 are welded.

Then, the glass pressing member 50 is pressed to the laser-fastening unit 520 side (Z2 side), and infrared light is radiated from above the pressing member 50. At this time, infrared light is radiated onto the bottom face 521b of the concave portion 521 of the laser-fastening unit 520 via the pressing member 50 and the optically transparent member 30.

As a result, the carbon which may be an additive in the laser-fastening unit 520 absorbs the light and generates heat near the bottom face 521b of the concave portion 521 in the laser-fastening unit 520 being radiated by infrared light, thereby raising a temperature beyond a fusing point of the base material PPS. As a result, the vicinity of the bottom face 521b of the concave portion 521 is fused. Further, heat is conducted to the top face 11 of the main unit 10 formed in a vicinity of the bottom face 521b in the concave portion 521 and the optically transparent member 30 arranged in the concave portion 521. As a result, as shown in FIG. 15, the top face 11 of the main unit 10 in the circumference of the concave portion 521 and the laser-fastening unit 520 are welded, and the inner faces (side face 521a and bottom face 521b) of the concave portion 521 in the laser-fastening unit 520 and the optically transparent member 30 are welded, and the weld portion 540 shown in FIG. 15 is formed. Lastly, the resin-junction body 501 shown in FIG. 15 is attained by removing the pressing member 50.

The following effects are attained by one or more embodiments.

As described above, according to one or more embodiments, it is possible to radiate light onto the bottom face 521b of the main unit 10 in the laser-fastening unit 520, via the optically transparent member 30 arranged in the concave portion 521 of the laser-fastening unit 520, by arranging in the concave portion 521 in the laser-fastening unit 520 the optically transparent member 30 having a relatively higher optical transparency than the main unit 10 and the laser-fastening unit 520. As a result, it is possible to fuse the main unit 10, and the laser-fastening unit 520 by the light radiated onto the bottom face 521b of the main unit 10 in the laser-fastening unit 520 being absorbed by the laser-fastening unit 520. For that reason, it is possible to weld the main unit 10 and the laser-fastening unit 520 by spreading the fusing range via the optically transparent member 30. As a result, even if the main unit 10 and the laser-fastening unit 520 both have relatively low optical transparency, and have the property to absorb light, it is possible adequately to join (e.g., weld) the main unit 10 and the laser-fastening unit 520.

Also according to one or more embodiments, by arranging the optically transparent member 30 in the concave portion 521 of the laser-fastening unit 520, it is possible to inhibit heat generated by radiated infrared light from escaping from the concave portion 521 using the optically transparent member 30. Still further, it is possible to adequately conduct the heat necessary for fusing thermoplastic-resin material to the main unit 10, and the laser-fastening unit 520 in the welding region W in the circumference of the concave portion 521, via the optically transparent member 30. For that reason, the main unit 10, and the laser-fastening unit 520 can securely be fused in the welding region W. As a result, the main unit 10 and the laser-fastening unit 520 can adequately be joined (e.g., welded).

SIXTH EXAMPLE

Next, embodiments of a sixth example will be described with reference to FIGS. 17-19. According to one or more embodiments of the sixth example, an optically transparent member 630 is not welded, which is different from the embodiments of the first to the fifth examples where the optically transparent member 30 (230, 330, and 430) was welded. Further, the same symbols are applied to the same or similar components as described in the first example. Explanations thereof will be omitted.

Figure 17:
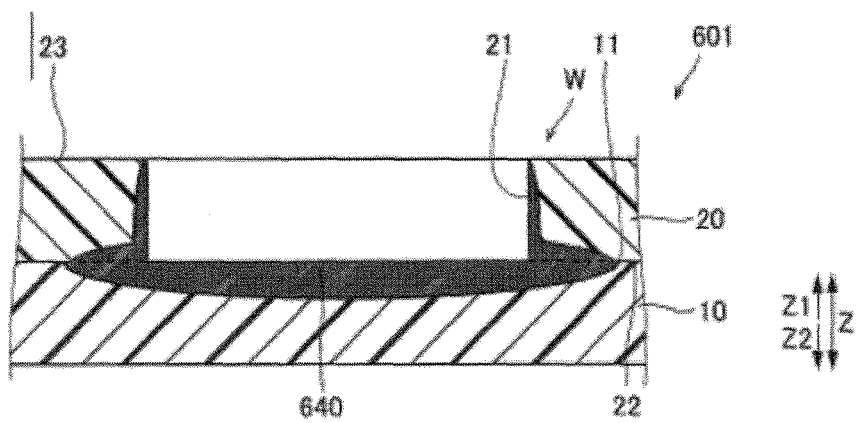
FIG. 17 is a perspective view of a resin junction body according to one or more embodiments of a sixth example of the present invention.

As shown in FIG. 17, a resin-junction body 601 according to one or more embodiments of the sixth example may comprise the main unit 10 and the laser-fastening unit 20. Specifically, differing from the first example, thermoplastic-resin material that includes thermoplastic-resin is not arranged in the hole 21 of the laser-fastening unit 20. Further, a weld portion 640 may be formed in the welding region W, where the main unit 10 and the laser-fastening unit 20 are fused at a boundary face of the main unit 10 and the laser-fastening unit 20. Further, other configurations of the sixth example are the same as the first example.

Next, a joining process of the resin junction body 601 according to one or more embodiments of the sixth example will be described with reference to FIGS. 17-19.

The following is an example. First, create the main unit 10 and the laser-fastening unit 20 in the same way as one or more embodiments of the first example.

Figure 18:
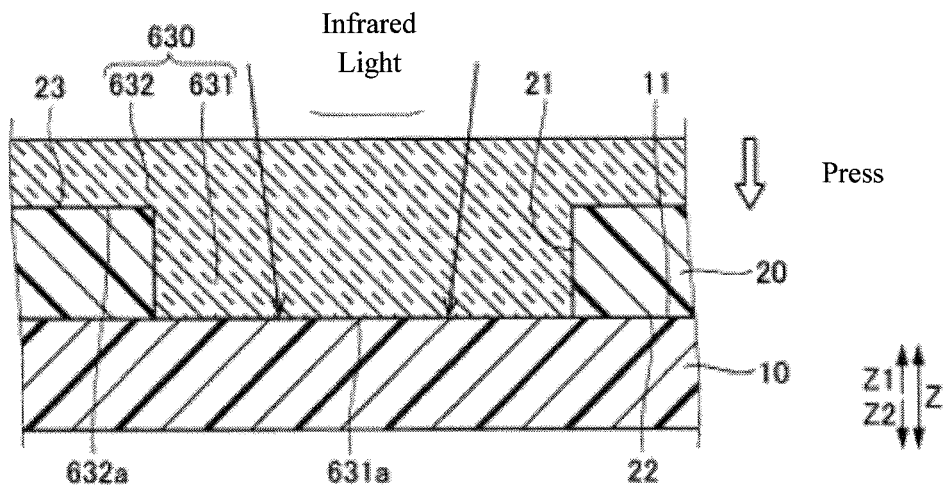
FIG. 18 is a view for explaining a resin junction body joining process according to one or more embodiments of the sixth example.

Then, the optically transparent member 630 is arranged in the hole 21 of the laser-fastening unit 20, with the main unit 10 and the laser-fastening unit 20 laminated in the thickness direction so that the main unit 10 is positioned at the Z2 side, as shown in FIG. 18. The optically transparent member 630 may have thermal conductivity without thermoplasticity, and may be composed of a material (for example, glass) having a relatively higher optical transparency than the main unit 10 and the laser-fastening unit 20. Further, the optically transparent member 630 may include a projection 631 arranged in the hole 21 in the laser-fastening unit 20, and a flange 632 arranged above the Z1 side of the projection 631. Further, when the projection 631 is arranged in the hole 21 of the laser-fastening unit 20, a bottom face (a face at the Z2 side) 631a of the projection 631 touches the top face 11 of the main unit 10, and a bottom face (a face at the Z2 side) 632a of the flange 632 touches the top face 23 of the laser-fastening unit 20.

Then, by pressing the optically transparent member 630 to the laser-fastening unit 20 side (Z2 side), the main unit 10 and the laser-fastening unit 20 are welded. Then, while pressing the optically transparent member 630 to the laser-fastening unit 20 side (Z2 side), infrared light is radiated from above the optically transparent member 630. At this time, infrared light is radiated onto the top face 11 of the main unit 10 that corresponds to the position where the hole 21 of the laser-fastening unit 20 is formed, via the optically transparent member 630.

As a result, the vicinity of the top face 11 of the main unit 10 is fused by the carbon additive in the main unit 10 generating heat by absorbing light, in the vicinity of the top face 11 of the main unit 10 radiated by infrared light. Thereafter, the vicinity of the top face 11 of the main unit 10, the bottom face 22 of the laser-fastening unit 20 in the circumference of the hole 21 to be welded to the top face 11 of the main unit 10, and the inner circumference face 21a of the hole 21 are fused by heat being conducted via the main unit 10 and the optically transparent member 630 that is to be welded to the main unit 10. As a result, a weld portion 640 is formed where the main unit 10 and the laser-fastening unit 20 are fused to the boundary face of the main unit 10 and the laser-fastening unit 20 and to the inner circumference face 21a of the hole 21. Conversely, the optically transparent member 630 is not fused because it has no thermoplasticity. As a result, the resin-junction body 601 shown in FIG. 17 is attained.

Figure 19:
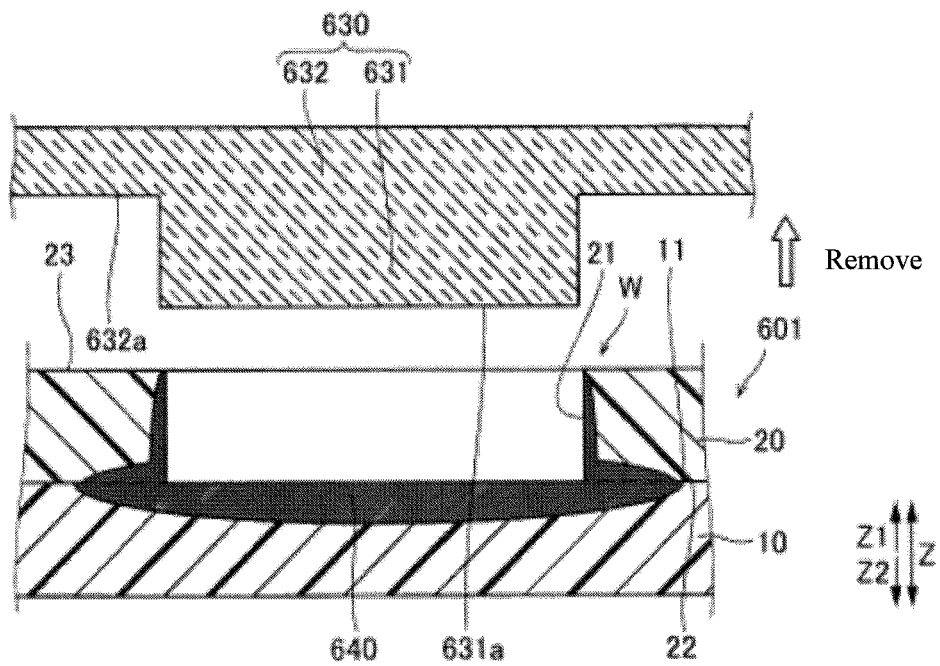
FIG. 19 is a view for explaining a resin-junction body joining process according to one or more embodiments of the sixth example.

Thereafter, as shown in FIG. 19, the optically transparent member 630 is removed from the hole 21 in the laser-fastening unit 20. As a result, the joining process of the resin-junction body 601 is ended.

The following effects are attained by one or more embodiments.

According to one or more embodiments, as described above, by arranging in the hole 21 of the laser-fastening unit 20 the optically transparent member 630 having a relatively higher optical transparency than the main unit 10 and the laser-fastening unit 20, it is possible to attain an adequate joint (weld) of the main unit 10 and the laser-fastening unit 20, even if the main unit 10 and the laser-fastening unit 20 both have relatively low optical transparency, and a property to absorb light in the same way as the first example described above.

Further, according to one or more embodiments, the main unit 10 and the laser-fastening unit 20 are welded, with the projection 631 on the optically transparent member 630 (composed of a material that is thermally-conductive without thermoplasticity and that has a relatively higher optical transparency than the main unit 10 and the laser-fastening unit 20) arranged in the hole 21 of the laser-fastening unit 20. After welding, the optically transparent member 630 is removed from the hole 21 in the laser-fastening unit 20. As a result, it is possible to repeatedly use the removed optically transparent member 630 for a different resin-junction body 601 or a different welding region W. Thus, it is possible to reduce the number of components compared to when preparing the optically transparent member 630 for each hole 21.

All embodiments disclosed herein are examples and are not to be construed to limit the invention. The scope of the present invention is indicated in the scope of patent claims. It is not limited to the descriptions of the embodiments above. Furthermore, all changes equivalent in meaning to and within the scope of patent claims, are included.

For example, although the second example discloses an example of arranging a frame-like optically transparent member 230 in a frame-like hole 221, the present invention is not limited thereto. According to one or more embodiments, it is also acceptable to arrange a frame-like optically transparent member in a frame-like concave portion. In such a case, it is acceptable to compose the optically transparent member from the thermoplastic-resin material, or from glass.

Further, according to one or more embodiments above, a leaf spring 335 may be integrally formed on the optically transparent member 330. However, the present invention is not limited thereto. In other embodiments, it is also acceptable to form the leaf spring independent of the optically transparent member. As a result, it is possible to remove the leaf spring after the joining process and use it another joining process, thereby making it possible to reduce the number of components. The leaf spring may be composed from a member having a high optical transparency.

Further, the first to the sixth examples disclose using PPS as the thermoplastic-resin. However, the present invention is not limited thereto. According to one or more embodiments, it is acceptable to use a thermoplastic-resin other than PPS. For example, using thermoplastic-resin having high optical transparency results in a significant difference in optical transparency depending on the presence of an additive. For example, for the thermoplastic-resin, it is also acceptable to use ABS (acrylonitrile butadiene styrene copolymer), PET (polyethylene terephthalate), PP (polypropylene), PS (polystyrene), or PE (polyethylene) or the like.

Further, the first to the fifth examples disclose that the thermoplastic-resin material of the first resin member (main unit), the second resin member (laser-fastening unit, cover), and the third resin member (optically transparent member) may include the same thermoplastic-resin (PPS). However, the present invention is not limited thereto. In other embodiments, it is acceptable to use a different thermoplastic-resin for the first resin member, the second resin member, and the third resin member. In such a case, it is possible compose the first resin member and the second resin member from a thermoplastic-resin (for example, PPS) having a relatively lower optical transparency than the third resin member, and to compose the third resin member from a thermoplastic-resin (for example, PPS) having a relatively higher optical transparency than the first resin member and the second resin member to make it possible to attain a relative difference in optical transparence between the first resin member, the second resin member and the third resin member.

Further, the first to the fourth examples disclose that either the main unit 10 (210), the laser-fastening unit 20 (420) or the cover 220, and the optically transparent member 30 (230, 330, 430) may be fused. However, the present invention is not limited thereto. According to one or more embodiments, it is acceptable if at least the first resin member (main unit) irradiated by infrared light is fused so that the first resin member and the second resin member (the laser-fastening unit, or the cover) are welded, and the second resin member and the third resin member (optically transparent member) are not fused.

Further, according to one or more embodiments above, either the main unit 10, the laser-fastening unit 520, or the optically transparent member 30 is fused. However, the present invention is not limited thereto. In other embodiments, it is acceptable if at least the second resin member (laser-fastening unit) irradiated by infrared light is fused, the first resin member (main unit) and the second resin member are welded, and the first resin member and the third resin member (optically transparent member) are not fused.

Further, according to one or more embodiments above, either the main unit 10 or the laser-fastening unit 20 is fused. However, the present invention is not limited thereto. In other embodiments, it is acceptable if at least the first resin member (main unit) irradiated by infrared light is fused, the first resin member and the second resin member (the laser-fastening unit) are welded, and the second resin member is not fused.

Further, according to one or more embodiments above, a projector 100 may be the predetermined electrical appliance. However, the present invention is not limited thereto. In other embodiments, the joining method of the present invention can be used in locations to mutually join resin members composed of a thermoplastic-resin material having relatively low optical transparency. It may be used for electrical equipment (for example, a television device or the like) other than the projector 100, or for other equipment (for example, optical devices) other than electrical equipment or the like.

Further, the fourth and the fifth examples disclose joining by pressing a glass pressing member 50 to the laser-fastening unit 20 (420, 520). However, the present invention is not limited thereto. According to one or more embodiments, it is also acceptable to implement a joining process that does not use a pressing member.

Further, the first to the sixth examples disclose using carbon as an additive. However, the present invention is not limited thereto. According to one or more embodiments, it is acceptable to use an additive other than carbon. Still further, it is acceptable not to use an additive. In such a case, it is acceptable to vary the optical transparency of the thermoplastic-resin material by processing the top face to have a higher or a lower frictional resistance of the top face of the thermoplastic-resin.

Further, the first to the sixth examples above disclose implementing the joining process using infrared light with a wavelength of approximately 915 nm. However, the present invention is not limited thereto. According to one or more embodiments, it is acceptable to implement the joining process using an infrared light having a wavelength that is approximately 900 nm or higher, or 1,000 nm or lower. It is also acceptable to implement the joining process using visible light other than infrared light, or ultraviolet light. Further, it is acceptable that the infrared light is not an infrared light laser light; it is also acceptable that the light includes a plurality of wavelengths.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

EXPLANATION OF LETTERS OR NUMERALS

1, 201, 301, 401, 501, 601 Resin-junction body
10, 210 Main unit (first resin member)
20, 420, 520 Laser-fastening unit (second resin member)
21, 221, 421 Hole
30, 230, 330, 430 Optically transparent member (third resin member)
100 Projector (predetermined electrical appliance)
220 Cover (second resin member)
335 Leaf spring
521 Concave portion
630 Optically transparent member
W Welding region

What is claimed is:
1. A resin-junction body comprising:
a first resin member formed by thermoplastic-resin material;
a second resin member comprising a hole and formed by thermoplastic-resin material; and
an entirety of a third resin member disposed inside the hole and formed by thermoplastic-resin material,
wherein optical transparency of the third resin member is higher than optical transparency of the first resin member and the second resin member, wherein the first resin member, the second resin member, and the third resin member are joined by being welded at a welding region, wherein the welding region extends from the hole towards the first resin member, wherein the hole comprises an inner side wall that contacts the third resin member, and wherein the welding region extends along the inner side wall in a direction vertical to the first resin member.

2. The resin-junction body according to claim 1, wherein an end of the welding region that extends towards the first resin member is tapered.

3. The resin-junction body according to claim 1, wherein the hole has a tapered shape such that a diameter of an opening of the hole becomes smaller toward a first resin member side.

4. The resin-junction body according to claim 1, wherein the welding region is formed by heat welding at least one of the first resin member and the second resin member.

5. The resin-junction body according to claim 4, wherein the welding region extends from the inner side wall toward the third resin member.

6. The resin-junction body according to claim 5, wherein the third resin member comprises a leaf spring that applies pressure toward the first resin member.

7. The resin-junction body according to claim 5, wherein the thermoplastic-resin materials of the first resin member, the second resin member, and the third resin member contain the same thermoplastic-resin.

8. The resin-junction body according to claim 5, wherein the thermoplastic-resin materials of the first resin member and the second resin member comprise a conductive additive, and the first resin member and the second resin member are disposed on portions of a predetermined electrical device requiring conductivity.

9. The resin-junction body according to claim 6, wherein the thermoplastic-resin materials of the first resin member, the second resin member, and the third resin member contain the same thermoplastic-resin.

10. The resin-junction body according to claim 6, wherein the thermoplastic-resin materials of the first resin member and the second resin member comprise a conductive additive, and the first resin member and the second resin member are disposed on portions of a predetermined electrical device requiring conductivity.

11. A method of forming a resin-junction body comprising:

providing a first resin member formed by thermoplastic-resin material;

providing a second resin member comprising a hole and formed by thermoplastic-resin material; and providing an entirety of a third resin member disposed inside the hole and formed by thermoplastic-resin material, wherein optical transparency of the third resin member is higher than optical transparency of the first resin member and the second resin member, wherein the first resin member, the second resin member, and the third resin member are joined by being welded at a welding region, wherein the welding region extends from the hole towards the first resin member, wherein the hole comprises an inner side wall that contacts the third resin member, and wherein the welding region extends along the inner side wall in a direction vertical to the first resin member.

* * * * *